No. 765,482. PATENTED JULY 19, 1904.
W. A. HARDY.
ARTIFICIAL FISHING BAIT.
APPLICATION FILED NOV. 16, 1903.
NO MODEL.
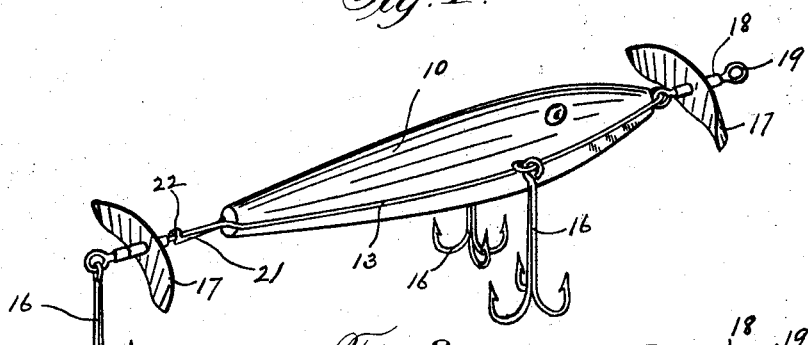
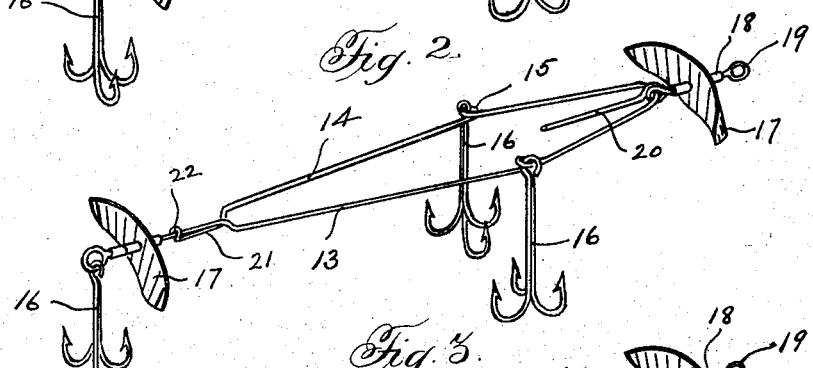
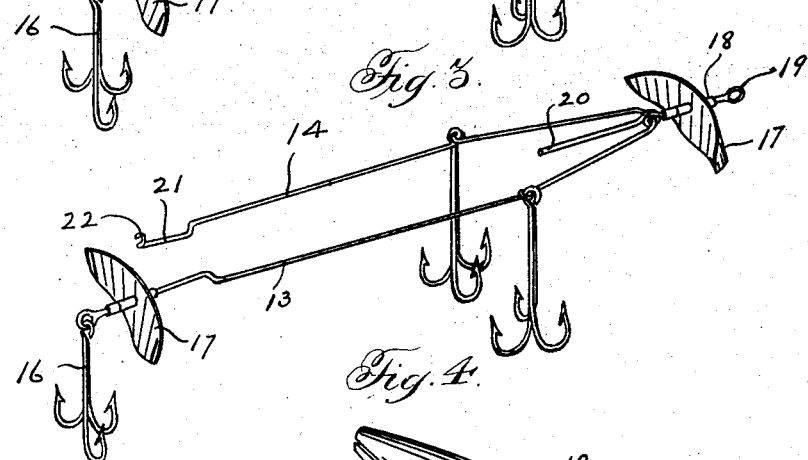
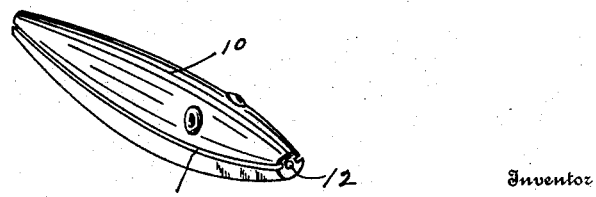

No. 765,482.

Patented July 19, 1904.

UNITED STATES PATENT OFFICE.

WILLIAM A. HARDY, OF MONTICELLO, INDIANA.

ARTIFICIAL FISHING-BAIT.

SPECIFICATION forming part of Letters Patent No. 765,482, dated July 19, 1904.

Application filed November 16, 1903. Serial No. 181,377. (No model.)

*To all whom it may concern:*

Be it known that I, WILLIAM A. HARDY, of Monticello, county of White, and State of Indiana, have invented a certain new and useful Artificial Fishing-Bait; and I do hereby declare that the following is a full, clear, and exact description thereof, reference being had to the accompanying drawings, in which like numerals refer to like parts.

The object of this invention is to improve the construction of artificial fishing-bait.

One feature consists in providing an arrangement whereby the part carrying the hooks may readily be removed from the bait, so as to change the color or character of the bait or the character of the hooks connected with the bait. This and the other features that I shall mention appear from the accompanying drawings and the following description and claims.

In the drawings, Figure 1 is a perspective view of the device. Fig. 2 is a perspective view of the device with the bait removed, the two sides or members of the hook-frame being united. Fig. 3 is the same with the members of the hook-frame being separated. Fig. 4 is a perspective view of the bait.

In detail 10 is an artificial bait made in the shape of a minnow preferably and of any color desired. It may be made of wood and has extending longitudinally along each side a groove 11, and it also has a hole 12 centrally located in the front end. I then provide a frame formed preferably of spring-wire bent at about a middle point, with the two ends turned back substantially parallel with each other to form the two sides or members 13 and 14. This frame may be otherwise made, provided it is adapted to detachably engage the bait and has a detachable connection between the two members. The two members or sides of this frame fit in the grooves 11 in the bait, so as to be embedded therein. In forming said frame of wire it is looped at certain points to form the eyes 15, with which the hooks 16 are connected. The number of these eyes may be increased as desired, and they may be formed otherwise than by looping the wire. The member 13 of the frame is longer than the member 14 and carries on its rear end a hook 16 and a loosely-mounted rotary spinner 17. A spinner 17 is also mounted on a sleeve 18 on the rod 20, that is pivotally connected to the front end of the hook-frame and having an eye 19 for a string. This rod 20 is continued inward to form an extension that enters the hole 12 in the bait. The bait is inserted between the two members of the frame, with the rod 20 extending into the hole 12 thereof, and the bait is pushed to the front as far as possible. Then the two members of the frame are connected at the rear ends, so that the bait will be clamped and held between them, and this is effected by providing a rearward extension 21 on the side or member 14 of the frame that is offset from the part 14 and is parallel with the rear end of the part 13, which is also offset from the main body of the part 13, so that the portion 21 of the member 14 will overlap the rear part of the member 13 and the hook 22 on the extension 21 will engage the rear portion of the member 13, so as to hold the two members together. The rear portion of each member is sprung into the hooked position, so that there is a tension tending to hold said hook in place to form a connection between the members of the frame. It is therefore seen that the hook-frame and the bait may be separated and either substituted by a frame with different or more hooks or a bait of different appearance, as desired. The hooks are preferably so made as to be detachable from the eyes 15.

What I claim as my invention, and desire to secure by Letters Patent, is—

1. The combination with artificial bait for fishing, of a hooked frame removably clamped thereon, and hooks suspended from said frame.

2. The combination with artificial bait for fishing, of a hook-frame formed of a wire bent in the desired shape and secured to said bait and having loops forming eyes, and hooks connected with said loops.

3. The combination of artificial bait having longitudinally-extending grooves oppositely located in the sides thereof, a hook-frame formed of wire embedded in said grooves and removably secured to the bait and the side members of said frame being removably connected with each other at one end.

4. The combination of an artificial bait having longitudinally-extending grooves oppositely located in the sides thereof, a hook-frame formed of spring-wire having two sides or members embedded in said grooves, one of said sides or members being kinked near its rear end with a straight rearward extension from the kink, and the other side or member being kinked near its rear end and having a parallel rear extension from the kink with a hook on the end of it to engage the extension from the other side or member.

5. The combination with artificial bait, of a hook-frame secured thereto, a rod pivotally connected with the front end of the hook-frame to which a string may be attached and a spinner mounted on said rod.

6. The combination with an artificial bait having a hole in the front end thereof, of a hook-frame detachably secured to said bait, a rod pivotally connected to the front end of the hook-frame with a rearward extension entering the hole in the bait and a forward extension to which a string may be secured, and a spinner on said rod.

7. The combination of an artificial bait having longitudinally-extending grooves oppositely located in the sides thereof, a hook-frame formed of spring-wire having two sides or members embedded in said grooves, one of said sides or members being longer than the other and both kinked toward each other at the end of the bait with a rearward extension from said kinks, the rearward extension on the longer side or member being longer than that in the shorter member, a hook in the shorter member adapted to engage said extension on the longer member, and a spinner and hook on the rear end of said longer member substantially as set forth.

In witness whereof I have hereunto affixed my signature in the presence of the witnesses herein named.

WILLIAM A. HARDY.

Witnesses:
   GEO. F. MARVIN,
   HARRY C. JOHNSON.